United States Patent [19]
Silverman

[11] Patent Number: 6,163,270
[45] Date of Patent: Dec. 19, 2000

[54] APPARATUS AND METHOD FOR CONTROLLING COMMUNICATION IN AN ELECTRONIC CONTROL AND MONITORING SYSTEM

[75] Inventor: David Phillip Silverman, Somerville, N.J.

[73] Assignee: AT&T Corp., New York, N.Y.

[21] Appl. No.: 09/046,048

[22] Filed: Mar. 23, 1998

[51] Int. Cl.[7] .................................................. G05B 23/02
[52] U.S. Cl. ......................... 340/825.15; 379/34; 379/29; 455/9
[58] Field of Search ........................ 340/825.15, 825.06, 340/825.08, 825.24, 825.25, 825.69, 825.72, 825.07; 455/9, 7; 379/29, 34

[56] References Cited

U.S. PATENT DOCUMENTS

| | | | |
|---|---|---|---|
| 5,067,099 | 11/1991 | McCown et al. ........................ | 364/550 |
| 5,081,543 | 1/1992 | Ramandi ................................. | 359/145 |
| 5,441,047 | 8/1995 | David et al. ............................ | 128/670 |
| 5,586,174 | 12/1996 | Bogner et al. .......................... | 379/106 |

*Primary Examiner*—Michael Horabik
*Assistant Examiner*—Anthony A. Asongwed

[57] ABSTRACT

An apparatus includes a demultiplexer/multiplexer and a local area network (LAN) controller that use an installed cable television cable to establish and control a home LAN. One or more channels of the cable are separated and blocked from the cable television signal path. The blocked channels form a signal path between the LAN controller and peripheral devices connected to the home LAN. The LAN controller is programmable to include a set of heuristics and corresponding instructions for monitoring and operating the peripheral devices. The LAN controller monitors the peripheral devices and provides status messages based on states of the peripheral devices. The LAN controller also receives and executes commands to operate the peripheral devices.

18 Claims, 5 Drawing Sheets

APPARATUS AND METHOD FOR CONTROLLING COMMUNICATION IN AN ELECTRONIC CONTROL AND MONITORING SYSTEM

This Application is related to U.S. Patent Application entitled "Method and Apparatus for Monitoring and Controlling a Local Area Network" filed on even date herewith by the same inventors under common assignees and which is hereby incorporated by reference.

BACKGROUND OF THE INVENTION

1. Field of Invention

This invention relates to a network controller communications device. In particular, the invention relates to a local area network (LAN) controller and communications device having a stored, programmable set of heuristics and instructions.

2. Description of Related Art

Most conventional security/monitoring systems are either wireless or hard-wired. Wireless systems rely on ultrasonic or radio frequency signals to provide control, monitoring and alarm functions. Hard-wired systems typically use dedicated wiring and components coupled to a system controller to provide system control, monitoring, alarm and display functions.

Both wireless and hard-wired systems have drawbacks. Wireless systems are more prone to false alarms. Hard-wired systems are more difficult (and hence expensive) to install. Further, most wireless and hard-wired controllers have only limited programming and display capabilities. Thus, new technology is needed to enhance home electronic control and monitoring systems.

SUMMARY OF THE INVENTION

The present invention provides a local area network (LAN) controller and a communications device that may be used with an electronic control and monitoring system. The LAN controller and the communications device may use any new or existing wired system or wireless system to communicate data to and to receive data from the electronic control and monitoring system. The LAN controller and the communication device may be used in conjunction with an electronic control and monitoring system in a home, an office building or other dwelling, a mobile structure and an unoccupied structure.

In a preferred embodiment, a demultiplexer/multiplexer and a network controller connect to a cable television wire at a demarcation point of a home. The demultiplexer/multiplexer demultiplexes a cable television signal to expose one or more channels. The exposed channels are then blocked from the cable television controller and are sent to a home LAN controller. The demultiplexer/multiplexer then multiplexes the remaining cable television channels with the two blocked channels. The remaining multiplexed cable television channels are then provided to a cable television. The exposed and blocked channels are used as a communications medium of an intelligent home LAN that functions as a home electronic control and monitoring system.

The home LAN controller detects states of peripheral devices in the home. For example, the state of a home appliance may be ON, OFF or IDLE. Additionally, the home LAN controller can be programmed with the behavior patterns of a user (i.e., residents of the home), including their routine schedule. For example, the home LAN controller can be programmed with the following: a first resident rises at 7 a.m., opens and closes a garage door between 7:45 and 8 a.m., returns between 5 and 5:30 p.m., again opening and closing the garage door and watches a television show at 8 p.m.; and a second resident rises at 8 a.m., leaves via a front door between 9 and 9:30 a.m. and returns after 4 p.m. The home LAN controller can also be programmed to detect which peripheral devices in the home, such as telephones, are active, by monitoring an off-hook signal, for example. The home LAN controller can then route status messages regarding the states of the peripheral devices to the residents, based on where the programming indicates the residents to be, and what peripheral devices are in use. Thus, in the above example, the home LAN controller can route a "garage door open message" to the resident watching television at 8 p.m., displaying the message as text on the television picture tube.

The home LAN controller may also display messages on a computer or the television, and can: turn the peripheral devices ON or OFF; take commands via the computer, the television, or the telephone; page residents via the telephone; and provide audio messages via the television, the computer and via the telephone in a "whisper" mode.

The peripheral devices coupled to the home LAN include a LAN interface. The LAN interface includes a processor module and a LAN interface module that allow the LAN interface to communicate between the peripheral device and the home LAN controller. The LAN interface monitors the status of the device to which it is coupled, and in accordance with its stored programming, sends data to the home LAN controller.

For example, when the LAN interface recognizes that the peripheral device is ON, the LAN interface then sends an appropriate signal to the home LAN controller.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

Figure 1:
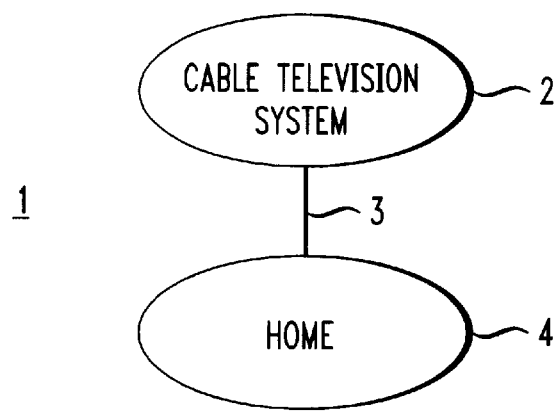
FIG. 1 is a cable television environment.

FIG. 1 shows a cable television environment 1 including a broadcast cable television system 2, which sends cable television signals over cable 3 to a home 4. The cable 3 may carry as many as 500 or more channels of televisions signals, with the channels multiplexed into a single signal.

Figure 2:
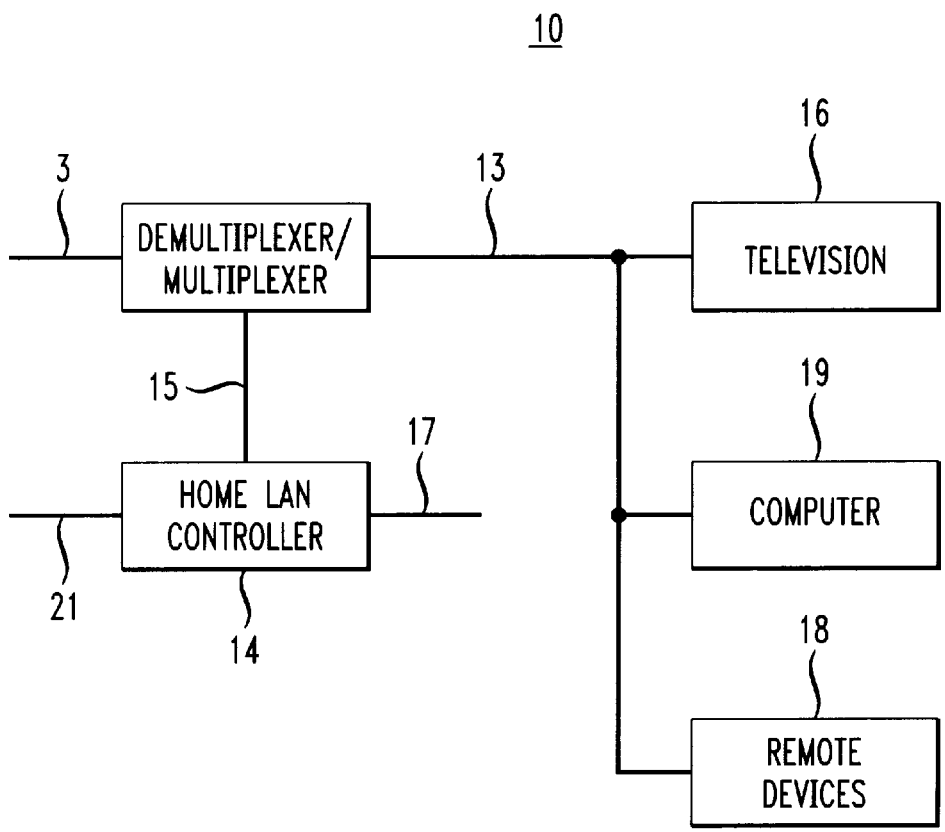
FIG. 2 shows a home local area network (LAN) using an exemplary home LAN controller.

FIG. 2 shows a home local area network (LAN) 10 used in the home 4 of FIG. 1 for monitoring/security functions and including an exemplary home LAN controller 14. The incoming cable television cable 3 terminates in a demultiplexer/multiplexer 12. The demultiplexer/multiplexer 12 demultiplexes the incoming 500 channels, using well-known techniques, to provide two separated data channels, (e.g., channels 499 and 500) for use in the home LAN system 10. In this embodiment, the demultiplexer/multiplexer 12 blocks the two separated data channels 499 and 500 from the cable television signal. Thus, the channels 499 and 500 cannot be used to supply the cable television signals. The remaining 498 channels then remain available for providing cable television signals to a cable-adapted television 16.

In the example noted above, two channels were exposed and blocked to form the signal path for the home LAN 10. However, the home LAN 10 is not limited to the use of two channels. A single channel capable of two-way communications could also be used. Alternately more than two channels could be used in the home LAN 10. Further, the demultiplexer/multiplexer 12 and the home LAN controller 10 can be combined into one network controller. Finally, a frequency or frequencies outside the bandwidth of the cable television signal and independent from the cable television system 2 may also be used for a communications channel.

Because the demultiplexer/multiplexer 12 is located at a demarcation point of the home 4 (i.e., the point at which the cable television system 2 ends and the home begins), any data contained in the downstream components (e.g., the home LAN controller 14 and the television 16), is effectively blocked from entering the cable 3 of the cable television system 2 that supplies the cable television signals. Therefore, problems (i.e., viruses) existing in the home LAN 10 cannot be transmitted to the cable television system 2, for example.

A signal line 15 carries the two data channels 499 and 500 to the home LAN controller 14. This allows the home LAN controller 14 to receive and transmit data simultaneously. That is, incoming data can be received over channel 499 while outgoing data is received over channel 500. The home LAN controller 14 receives external electrical power through AC power line 17.

The demultiplexer/multiplexer 12 multiplexes the two blocked channels 499 and 500 and the remaining 498 channels, using well-known techniques, to provide a signal to peripheral devices connected to the home LAN 10. A signal line 13 carries the 498 channel television channels and the two blocked data channels 499 and 500. The signal line 13 connects between the demultiplexer/multiplexer 12 and the peripheral devices including the television 16, a computer 19 and other remote devices 18. The other remote devices could include appliances such as a coffee maker, an overhead light for a room, and a home heating system, for example. In general, any device capable of being controlled by a processor can be adapted for use with the home LAN 10.

Figure 3:
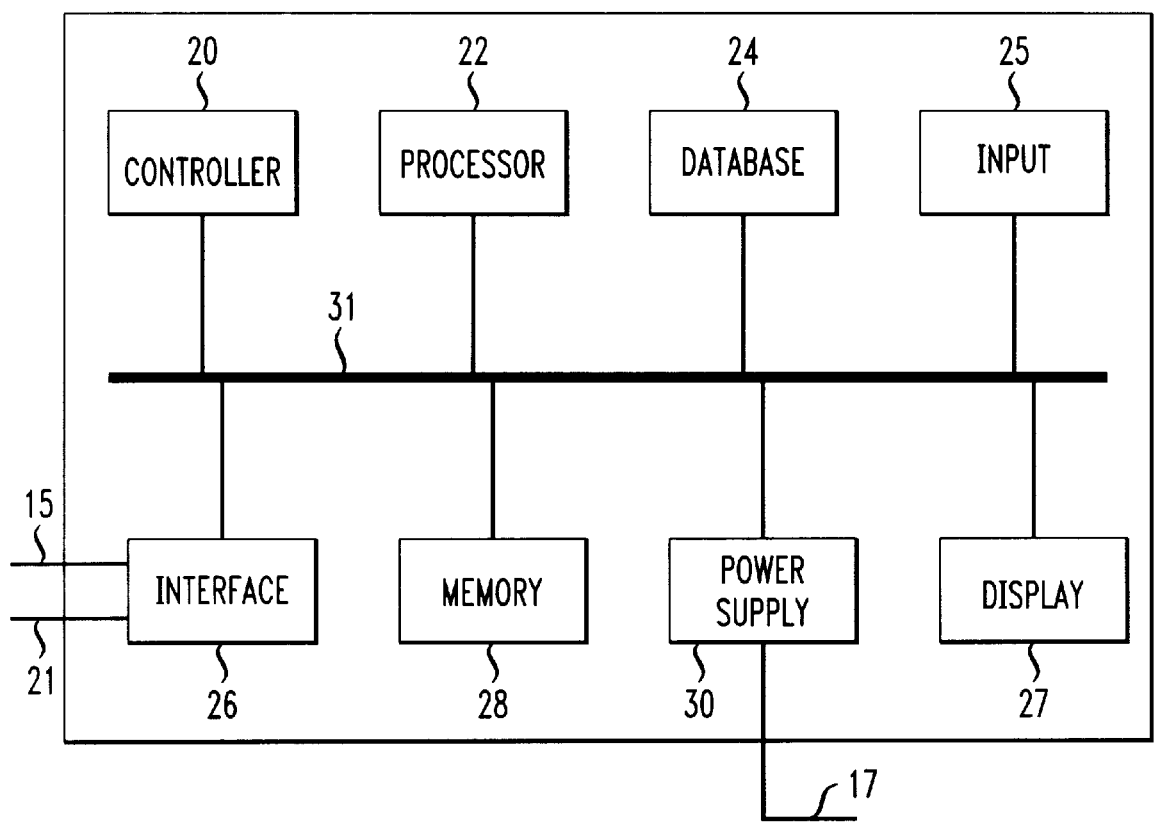
FIG. 3 shows the home LAN controller of FIG. 2 in more detail.

FIG. 3 shows an exemplary embodiment of the home LAN controller 14 of the invention. As noted above, the home LAN controller 14 provides control signals to and receives monitoring signals from the television 16, the computer 19 and other remote devices 18 over the signal line 13, using the two separated data channels 499 and 500. The home LAN controller 14 includes a transmit/receive interface 26, a memory 28 and a database 24. A processor 22 performs data manipulation under control of a controller 20. Power to the LAN controller is received in a power supply 30. Finally, a user (e.g., a resident of the home 4) communicates with the home LAN controller 14 through an input 25 and a display 27.

The transmit/receive interface 26 receives inputs from and provides output to the signal line 15. For example, incoming data can be received via the data channel 499 and outgoing data transmitted over the data channel 500. The interface 26 also connects the home LAN controller 14 to a home telephone system via a telephone wire 21. The power supply 30 receives AC power from the home's electrical system over the power line 17. The power supply 30 converts the power supplied by the home 4 to power usable by the home LAN controller 14. The power supply 30 also includes a backup DC power supply (e.g., a battery) in case the AC power supply fails.

The memory 28 is a volatile, or flash memory, such as an EEPROM. The memory 28 receives signals such as "power on" via the interface 26 from the television 16, the computer 19 and other remote devices 18 that are connected to the home LAN 10. For example, when the television 16 is turned ON, the memory 28 records this condition (i.e., power on) and the time of its occurrence. When a television channel is changed, the memory 28 records the fact that the television channel was changed, the new television channel selected, and the time the television channel was changed. Similar data is recorded for the other peripheral devices. For example, when a garage door (not shown) is opened, the memory 28 registers an "OPEN condition" for the garage door and the time the garage door was opened. The memory 28 thus stores the current status of the peripheral devices that are connected to the home LAN controller 14.

The database 24 stores heuristics and instructions for operating the home LAN 10 and the connected peripheral devices. For example, if the television 16 is ON, and the garage door is OPEN and remains open for greater than five minutes, the heuristics in the database 24 can require that a message be displayed on the television 16 indicating that the garage door is open. Thus, the database 24 is programmable to support tailored operations for individual residents of the home 4. The residents can program in the heuristics that control the interpretation of data supplied to the LAN controller 14 and can program in the instructions that provide outgoing data, which can be displayed on the television 16 and the computer 19, or to operate the peripheral devices, for example.

The processor 22 processes data such as the television ON signal, and compares the results to the heuristics and the instructions stored in the database 24. When the processed data matches a predefined condition in the database 24, the processor 22 selects an appropriate instruction from the database 24 and generates an action, or outgoing data signal, to be supplied to the appropriate peripheral device, for example.

The controller 20 provides overall system control of the home LAN controller 14 and communicates with other components of the home LAN controller 14 over a two-way signal bus 31. The user interacts with the home LAN controller 14 primarily via the an input 25 and a display 27. The input 25 may be an alphanumeric keypad, for example. The display 27 may be a liquid crystal display, for example. The user can use the input 25 to program the database 24 and to perform diagnostics on the home LAN 10. Alternately, the user can interact with the home LAN controller 14 by logging on to the home LAN 10 using the computer 19. The computer 19 can then be used to program the database 24 and to perform checks of the home LAN 10.

In operation, the database 24 of the home LAN controller 14 is programmed according to the desires of the user. As noted above, the programming can be performed using either the input 25 or the computer 19. The programming can include entering a set of heuristics that direct the home LAN controller 14 to take specific actions when certain events occur. For example, the user can program a series of conditions and actions related to the garage door. The user can start by selecting "garage door" from a menu of peripheral devices stored in the database 24, and displayed on the display 27. The input 25 is then used to type in a condition, or "if" statement, related to the garage door such as "open" or "open greater than five minutes". Next, a second "if" statement can be entered, such as "if television in use." The database 24 can be further programmed to recognize the television 16 as in use if some activity has occurred within a specified time frame (e.g., change channels within last five minutes) or if the television 16 is ON at a specified time (indicating that a user is following a routine of watching a particular television show). Finally, a "then" statement can be provided to require a message to be displayed, such as "the garage door is open," or an action executed, such as "shut the garage door."The entire string would then read as follows:

if garage door open >5 minutes; and
if tv in use (tv in use=tv on and channel changed <5 minutes or tv on, day=Wednesday, time=8:00–8:30 p.m.);
then tv display "garage door open".

Figure 4:
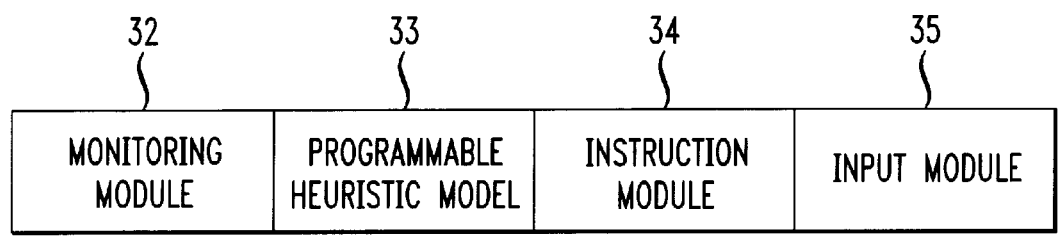
FIG. 4 is a logical example of a database of the home LAN controller.

FIG. 4 is a logical example of the database 24 according to the invention. A monitoring module 32 contains data regarding the peripheral devices that are connected to the home LAN 10. For example, the monitoring module 32 contains a list of the peripheral devices, their locations in the home 4 and their allowable conditions (e.g., ON, OFF and IDLE). An input module 35 receives input signals from the input 25. A programmable heuristic module 33 stores the heuristics that are programmed into the database 24 by the user via the input module 35. An instruction module 34 contains programmable instructions that are programmed into the database 24 by the user or come preinstalled with the home LAN controller 14.

As noted above, any device capable of being controlled by an appropriate processor can be coupled to the home LAN 10. To communicate with the home LAN controller 14, these devices require a LAN interface that can receive and transmit data, and can process signals from the device. The LAN interface will be described later.

Figure 5:
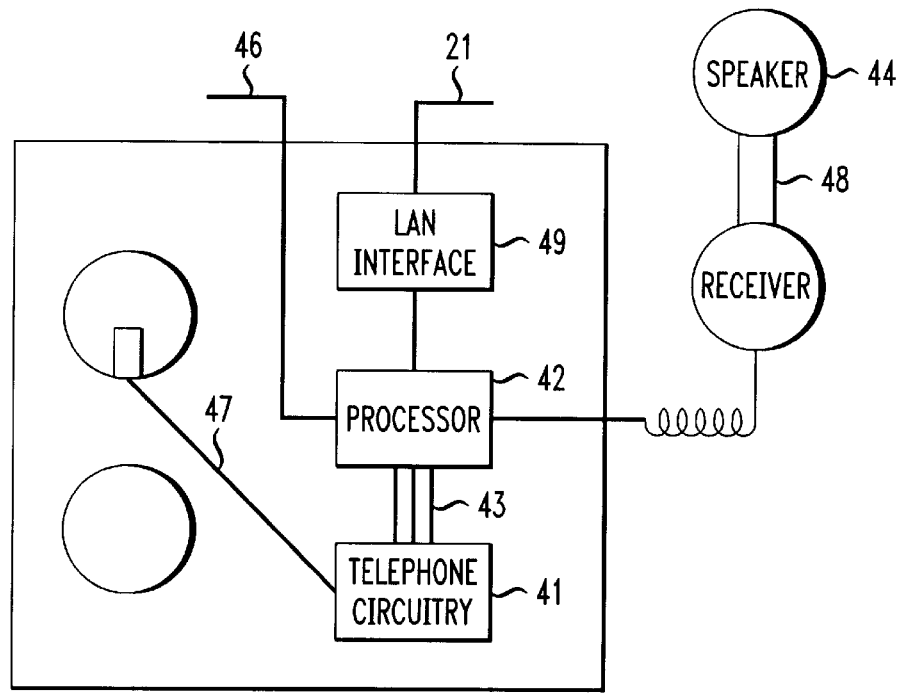
FIG. 5 is a diagram of an exemplary telephone adapted for use with the home LAN controller.

FIG. 5 is an example of a telephone 40 adapted for use with the home LAN 10. When a handset 48 is off-hook, an off-hook signal is sent to telephone circuitry 41. The telephone circuitry 41 functions in the standard manner for a telephone. The off-hook signal is then sent via a data bus 43 to a processor 42, where the off-hook signal is converted for use with the home LAN controller 14. The signal is then routed to a LAN interface 49, which connects to the telephone line 21, and hence to the home LAN controller 14. Because the telephone 40 is a peripheral device registered in the monitoring module 32, the home LAN controller 14 registers an off-hook condition for the telephone 40 in the memory 28. The processor 42 also receives inputs (e.g., normal telephone conversation) and transmits outputs via a telephone line 46. In this example, the telephone 40 is shown as a standard wired telephone. However, the telephone 40 may also be a wireless telephone.

Because the telephone 40 is connected to the home LAN 10, the telephone 40 can also provide audible signals from the home LAN controller 14 to the user. Returning to the example of the garage door opener, the home LAN controller 14 registers an "OPEN" condition of the garage door, without a corresponding "SHUT" condition. If the telephone 40 is off-hook, the home LAN controller 14 can send an audible signal to the speaker 44 of the handset 48, such as "the garage door is open". Since this audible signal is supplied only to the speaker 44 and not a microphone 45 of the handset 48, only the user will receive the audible status message concerning the garage door, and not a party at the other end of the telephone call.

The home LAN 10 can also be used with a telephone outside the home. Using an outside telephone, (e.g., a cellular phone while in a car away from the home) the user can log on to the home LAN controller 14. The user can remotely operate the home LAN controller 14 by using the alphanumeric key pad of the cellular phone, for example. The home LAN controller 14 can provide audible responses back to the user, or can display a status message in a display of the cellular phone.

Figure 6:
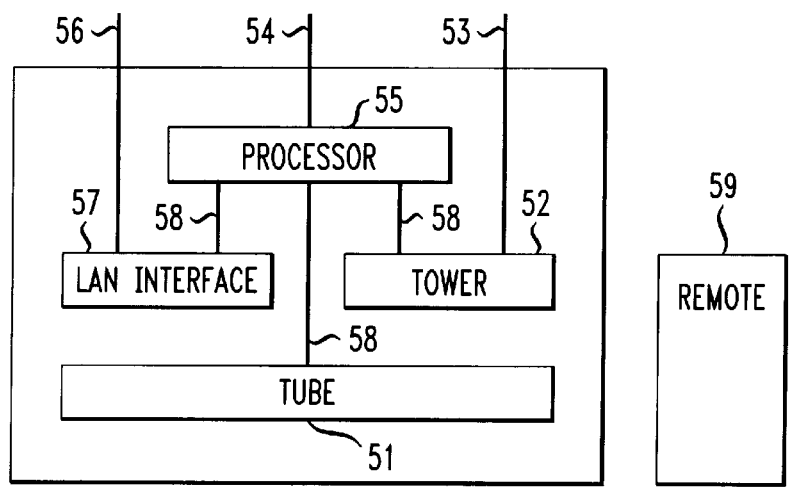
FIG. 6 is a diagram of an exemplary television adapted for use with the home LAN controller.

FIG. 6 shows a television 50 adapted for use with the home LAN system 10. The television 50 receives cable television signals via a signal line 53 (carrying channels 1–498), which connects to the signal line 13, and a tuner 52. The tuner 52 sends the cable television signal over signal line 58 to a processor 55 to generate the appropriate television signal. The television signal is then sent over the signal line 58 to the tube 51. The tube 51 may be any television display such as a cathode ray tube and a liquid crystal display, for example. The processor 55 receives and conditions power supplied from a power supply line 54. The television 50 can be controlled by a remote control 59, which uses infrared or radio frequency signaling to send data to the television 50.

In cooperation with the home LAN 10, the television 50 can transmit data to and receive data from the home LAN controller 14. Data is sent from the home LAN controller 14 over a two-way LAN signal line 56 (carrying channels 499 and 500), which connects to the signal line 13, to a LAN interface 57, and from the processor 55 via the signal line 58, the LAN interface 57 and the signal line 13. For example, the programmable database 24 of FIG. 3 can be configured to provide visual messages on the tube 51 when required conditions within the database 24 are satisfied.

Figure 7:
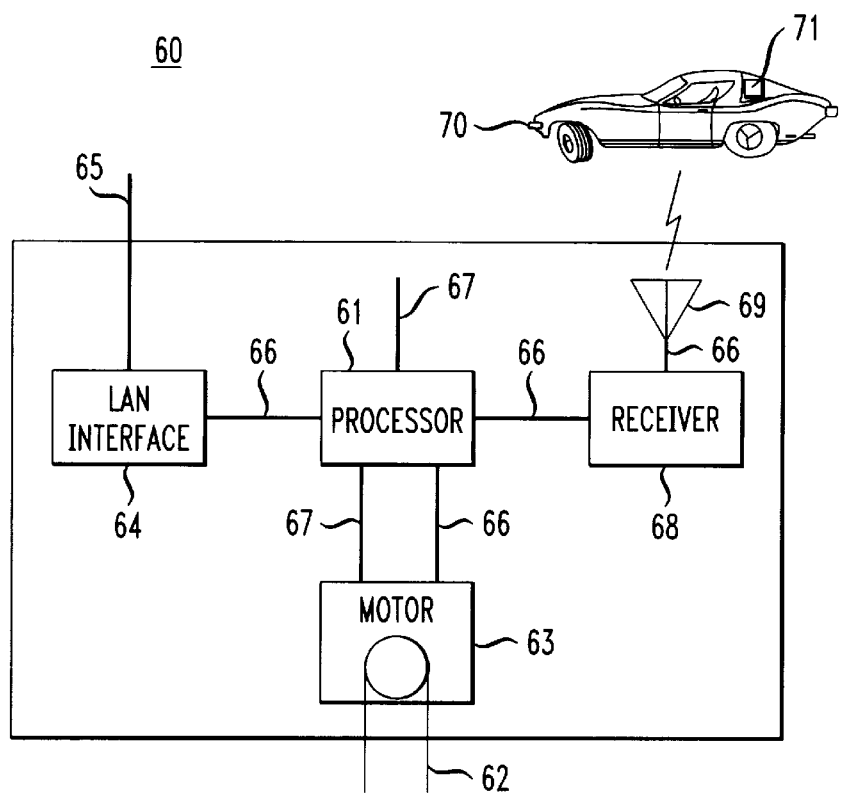
FIG. 7 is a diagram of an exemplary garage door opener adapted for use with the home LAN controller.

FIG. 7 shows a garage door opener 60 adapted to operate with the home LAN 10 of FIG. 2. An automobile 70 includes a remote garage door opener 71. A driver operates the remote garage door opener 71, which sends a radio frequency signal to an antennae 69 to open a garage door (not shown). The signal passes to a receiver 68 and a processor 61 over signal line 66. The processor 61 is powered from an AC power source over power line 67. Upon receiving the "open" signal, the processor 61 signals a reversible motor 63 to operate in the "open" direction. The motor 63 drives a chain 62 to open the garage door.

When the garage door reaches the "open" position, the motor 63 stops and the processor 61 sends a signal over signal line 66 to a LAN interface 64. The LAN interface 64 is designed to communicate with the home LAN controller 14 over communication line 65, and sends a "OPEN" status message to the home LAN controller 14. The "OPEN" condition of the garage door is then registered in the memory 28.

If the television 50 is also ON, the OPEN condition of the garage door can be displayed on the tube 51, after a specified period of time, from 0 to 5 minutes, for example.

The user can respond to the OPEN condition message by ignoring the message, in which case the message continues to be displayed. Alternately, the user can acknowledge the message, in which case the message is deleted and is no longer displayed on the tube 51. Finally, the user can instruct the home LAN controller 14, using the remote control device 59 and an on-screen display, to shut the garage door. When the garage door shuts, a "SHUT" status message can be momentarily displayed on the tube 51.

The peripheral devices can also be operated by the home LAN controller without a direct input from the user. The database 24 can contain heuristics and instructions that direct the home LAN controller 14 to send a command signal to a peripheral device based on the occurrence of an event. For example, the database 24 could be programmed such that if the garage door opens after 9 p.m., to turn on a light in a kitchen of the home 4.

Figure 8:
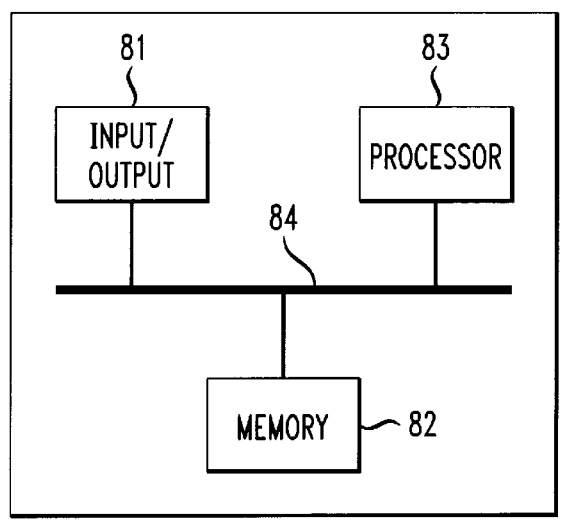
FIG. 8 is a diagram of a LAN interface.

All the above described peripheral devices include a LAN interface. FIG. 8 shows a diagram of a LAN interface 80, which includes an input/output 81, a memory 82 and a processor 83, all of which communicate via two-way signal bus 84. The input/output 81 receives data from and sends data to the attached peripheral device. The input/output 81 also communicates with the home LAN controller 14 over the signal line 13. The memory 82 stores programs and data related to the specific peripheral device to which the LAN interface 80 is attached. The processor 83 processes data received from input/output device 81.

Figure 9:
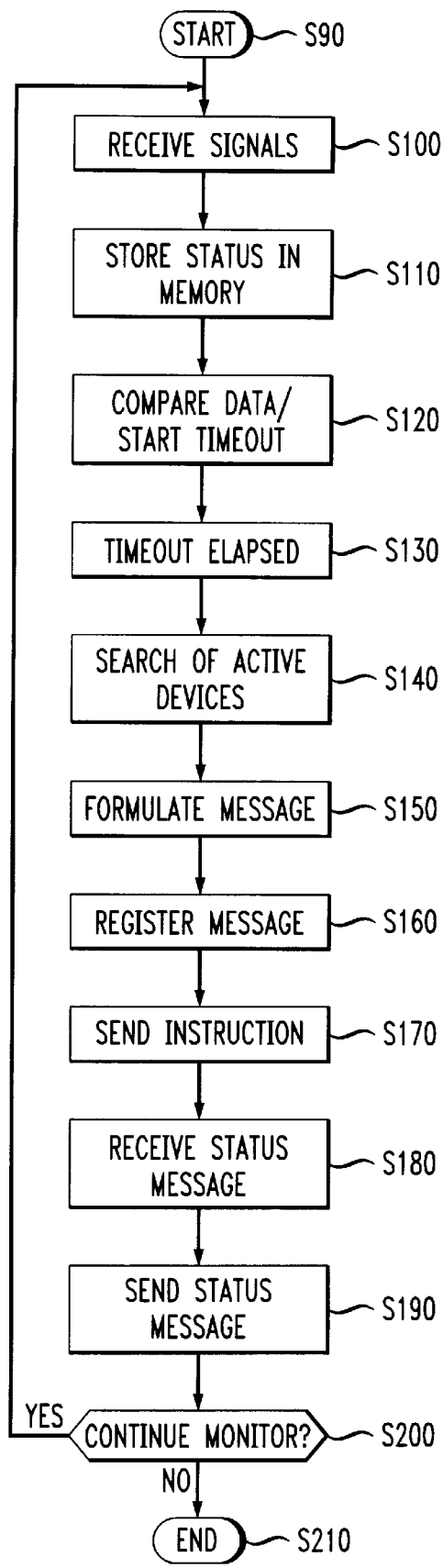
FIG. 9 is a flowchart illustrating an operation of the home LAN of FIG. 2.

Operation of the home LAN 10 of FIG. 2 is described below using the flowchart of FIG. 9, based on the following example. A home LAN 10 includes the home LAN controller 14 coupled to the television 50, the garage door opener 60, a first and a second telephone, which are similar to the telephone 40, and the computer 19. The television 50 is ON and the channel has just been set to channel 13 (i.e., the channel corresponding to the viewing habit of a user). The computer 19 is IDLE (e.g., ON and not receiving commands via key strokes). The time is 8 p.m. on Wednesday. The house has three users, a mother, a father and a daughter. The second telephone is in the daughter's bedroom. At 8:01 p.m. the second telephone goes off-hook and the garage door opens.

The process starts in step S90. In step S100 the home LAN controller 14 receives the signals "second telephone off-hook" and "garage door open." The process then proceeds to step S110. In step S110, the home LAN controller 14 stores the OFF-HOOK and OPEN signals in the memory 28. The process then moves to step S120. In Step S120, the processor 22 compares the OPEN signal for the garage door stored in the memory 28 with data stored in the database 24 and activates a 5 minute time-out. The process then moves to step S130. In step S130, the processor 22 determines that 5 minutes have elapsed since receipt of the garage door OPEN signal without a corresponding garage door SHUT signal. The process then moves to step S140.

In step S140, the processor searches the memory 28 to determine which devices are active. In step S140, the processor 22 determines that the second telephone is OFF-HOOK and concludes that the daughter is in her bedroom, that the television 16 is ON and being watched by the husband, since it is after 8 p.m. on Wednesday and the channel was changed to channel 13 within 5 minutes of 8 p.m. Finally, the processor 22 determines that the computer 19 is IDLE due to an absence of key stokes within a specified time. The process then moves to step S150.

In step S150, the processor 22 formulates a message "garage door is open, please select from the following:
 Ignore
 Turn off message
 Shut garage door"

and displays the message on the television 50. The processor 22 also formulates the message "your mother is home" and sends it to the second telephone where an audible version of the message is played over a speaker of the second telephone (i.e., in the whisper mode). The process then moves to step S 160.

In step S160, the home LAN controller 14 registers the instruction "shut garage door," which was entered by the husband using the remote control 59. The process then moves to step S170. In step S170, the home LAN controller 14 sends the instruction "shut garage door" to the garage door opener 60. The process then moves to step S180.

In step S180, the home LAN controller 14 receives the signal "garage door shut."The processor 22 then stores the shut signal in the memory 28 and deletes the "OPEN" signal. The process then moves to step S190.

In step S190, the home LAN controller 14 sends the signal "garage door shut" to the television 50, where it is momentarily displayed on the tube 51. The process then moves to step S200. In step S200, the processor 22 determines if additional monitoring is required. If additional monitoring is required, the process returns to step S100 and the home LAN controller 14 monitors the status of the home LAN 10. Otherwise, the process moves to step S210 and ends.

The controller 20 and the processor 22, as shown in FIG. 3, can be implemented on a programmed microprocessor or microcontroller and peripheral integrated circuit elements, and ASIC or other integrated circuit, a digital signal processor, a hard-wire electronic or logic circuit such as a discrete element circuit, a programmable logic device such as a PLD, PLA, FPGA or PAL or the like. In general, any device capable of implementing the flowchart of FIG. 9 can be used to implement the controller 20 and the processor 22.

The database 24, as shown in FIG. 3, is preferably implemented using static or dynamic RAM. However, the database can also be implemented using a floppy disk and disk drive, a writable optical disk and disk drive, a hard drive, a flash memory or the like.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for operating a local area network that controls and monitors a plurality of devices, comprising:
 monitoring a status of at least one of the devices;
 obtaining at least one instruction;
 controlling the devices based on the status, the instruction and heuristics retrieved from a database,
 comparing the status against the heuristics to detect a difference result; and
 generating at least one of an alert signal to be output through one of the devices and a command signal to one of the devices based on the difference result and the instruction.

2. The method of claim 1, wherein the heuristics include:
 a plurality of device states;
 a plurality of conditions, the conditions relating to at least one of the device states and data entries received from a user interface;
 behavior patterns of a user of the local network; and
 time durations and time of day corresponding to selected ones of the device states and the behavior patterns.

3. The method of claim 2, further comprising outputting a menu of possible commands through the user interface, the menu being composed based on the status of the device and the heuristics, wherein the command is obtained through the user interface in response to the menu.

4. The method of claim 3, wherein the menu is provided over a telephone coupled to the local network, the desired command being selected by one of operation of a keypad of the telephone and voice receipt of the desired command.

5. The method of claim 3, wherein the telephone is one of a wired telephone, a wireless telephone and a cellular telephone.

6. The method of claim 3, wherein the menu is provided on a display of a television coupled to the network.

7. The method of claim 5, wherein the menu is provided on a display of a computer coupled to the network.

8. The method of claim 2, further comprising generating a command completed message upon a completion of the command, the command completed message being displayed through the user interface.

9. The method of claim 2, wherein the heuristics are entered into the database through the user interface.

10. The method of claim 1, further comprising retrieving the instruction from the database, wherein the instruction is expressed in logical statements that include:
   an if-then logical construction; and
   an if-then-else logical construction.

11. The apparatus for operating a local network that controls and monitors a plurality of devices, comprising:
   a memory that contains a database;
   a controller coupled to the memory, wherein the controller monitors a status of at least one of the devices, obtains at least one instruction, and controls the device based on the status, the instruction and heuristics retrieved from the database and the controller compares the status against the heuristics to detect a difference result, and generates at least one of an alert signal to be output through one of the devices and a command signal to one of the devices based on the difference result and the instruction.

12. The apparatus of claim 11, wherein the heuristics include:
   a plurality of device states;
   a plurality of conditions, the conditions relating to at least one of the device states and data entries received from a user interface;
   behavior patterns of a user of the local network; and
   time durations and time of day corresponding to selected ones of the device states and the behavior patterns.

13. The apparatus of claim 12, the controller outputting a menu of possible commands through the user interface, the menu being composed based on the status of the device and the heuristics, wherein the command is obtained through the user interface in response to the menu.

14. The apparatus of claim 13, wherein the menu is provided over a telephone coupled to the network, the desired command being selected by one of operation of a keypad of the telephone and voice receipt of the desired command.

15. The apparatus of claim 13, wherein the command is selected through a user interface, based on the status and the menu of possible commands generated by the controller.

16. The apparatus of claim 15, wherein the status messages and the menu are provided on one of a telephone, a television and a computer.

17. The apparatus of claim 12, wherein the heuristics are entered into the database through the user interface.

18. The apparatus of claim 11, the controller retrieving the instruction from the database, wherein the instruction is expressed in logical statements that include:
   an if-then logical construction; and
   an if-then-else logical construction.

* * * * *